Nov. 21, 1933.  W. J. COULTAS  1,935,766
HARVESTER
Filed Nov. 8, 1929  2 Sheets-Sheet 1

WITNESS
Walter Ackerman

INVENTOR
Wilbur J. Coultas
BY
Brown, Jackson, Boettcher & Dienner
ATTORNEYS

Nov. 21, 1933.   W. J. COULTAS   1,935,766
HARVESTER
Filed Nov. 8, 1929   2 Sheets-Sheet 2

WITNESS
Walter Ackerman

INVENTOR
Wilbur J. Coultas
BY
Brown, Jackson, Boettcher & Dienner
ATTORNEYS

Patented Nov. 21, 1933

1,935,766

UNITED STATES PATENT OFFICE 1,935,766

HARVESTER

Wilbur J. Coultas, Moline, Ill., assignor to Deere & Company, Moline, Ill., a corporation of Illinois Application November 8, 1929. Serial No. 405,592

5 Claims. (Cl. 130—5)

This invention relates to corn harvesters and more particularly to a shaker or oscillatory hopper bottom for feeding the ears of corn to the husking rolls. The invention has particular application to two-row harvesters because of the need for increased capacity and rapidity of operation of the husking mechanism, but it will be understood that the invention may also be embodied in one-row machines.

Generally in two-row corn harvesters, the corn ears are received from snapping mechanisms by an elevator which delivers them into a hopper, whence they are delivered to the husking rolls. Occasionally, there is a tendency on the part of the corn ears to rapidly accumulate in a haphazard manner in the hopper causing a failure of continuous feeding of the corn ears to the husking rolls and consequent congestion at the throat of the hopper, necessitating the stopping of the harvester and manual straightening of the congested corn ears in the hopper and manual delivery of the corn ears to the husking rolls, thus resulting in delay in harvesting.

It is the main object of this invention to provide a novel means for the hopper for relieving and obviating the possibility of congestion of the corn ears in the hopper. This is accomplished by the provision of a shaker means forming the hopper bottom, which, by an oscillatory motion, keeps the corn ears moving toward the husking rolls. By giving the shaker means a vertical up and down motion as well as longitudinal oscillatory movement, clogging and congestion of the corn ears at the throat of the hopper are entirely avoided.

Another object is the provision of a novel shaker means which will in its oscillatory motion cause the corn ears to assume a longitudinal position with respect to the husking rolls and assures of the delivery of the corn ears to the husking rolls in such a position that the husking operation can take place promptly upon the depositing of the corn ears on the husking rolls. To this end, the shaker hopper bottom is provided with longitudinal corrugations. As the corn ears are received on the shaker bottom, the shaker means not only keeps the corn ears in motion tending to promptly deliver them to the husking rolls, but by the constant abutment of the corn ears with the crests and troughs of the corrugations in shaking, the ears are arranged in longitudinal alignment with the husking rolls and are delivered thereto in such position.

A further object is the provision of a novel end shield or pan for the hopper. With the shaker hopper bottom in motion and inasmuch as such motion is oscillatory, an end shield has been provided for the hopper whereby the possibility of congestion at the receiving end of the hopper is avoided. This end shield comprises an arcuate shaped member pivotally supported at and extending transversely across the rear end of the hopper.

The rear edge of the end shield is pivotally supported at the back of the hopper, with the front edge thereof resting on the oscillatory hopper bottom. Thus, as the hopper bottom oscillates, the shield oscillates therewith and causes the corn ears to move in a direction away from the rear end of the hopper, down the shaker hopper bottom.

Another object is to provide a suitable bearing surface on the contacting edge of the end shield. The underside of the end shield is provided with a strip of leather or like pliable material extending transversely of the end shield and adjacent to the edge thereof which is adapted to rest on the crests of the corrugations of the shaker hopper bottom, providing a bearing contact between the two members which is noiseless and easily and cheaply replaceable, thus eliminating wear of both the end shield and the hopper bottom incident to the sliding contact between these two members.

A further object is the provision of an improved operating means for the oscillatory hopper bottom. The hopper bottom is oscillated by a crank shaft and crank arms suitably connected to the hopper bottom, the crank shaft in turn being rotated by a suitable drive connection to the husking roll operating shaft. By the provision of this operating means, the same driving means which operates the husking roll driving shaft also operates the hopper bottom.

Other and further objects will appear from the following detailed description of a preferred embodiment of my invention, illustrated in the accompanying drawings, in which.

Figure 1:
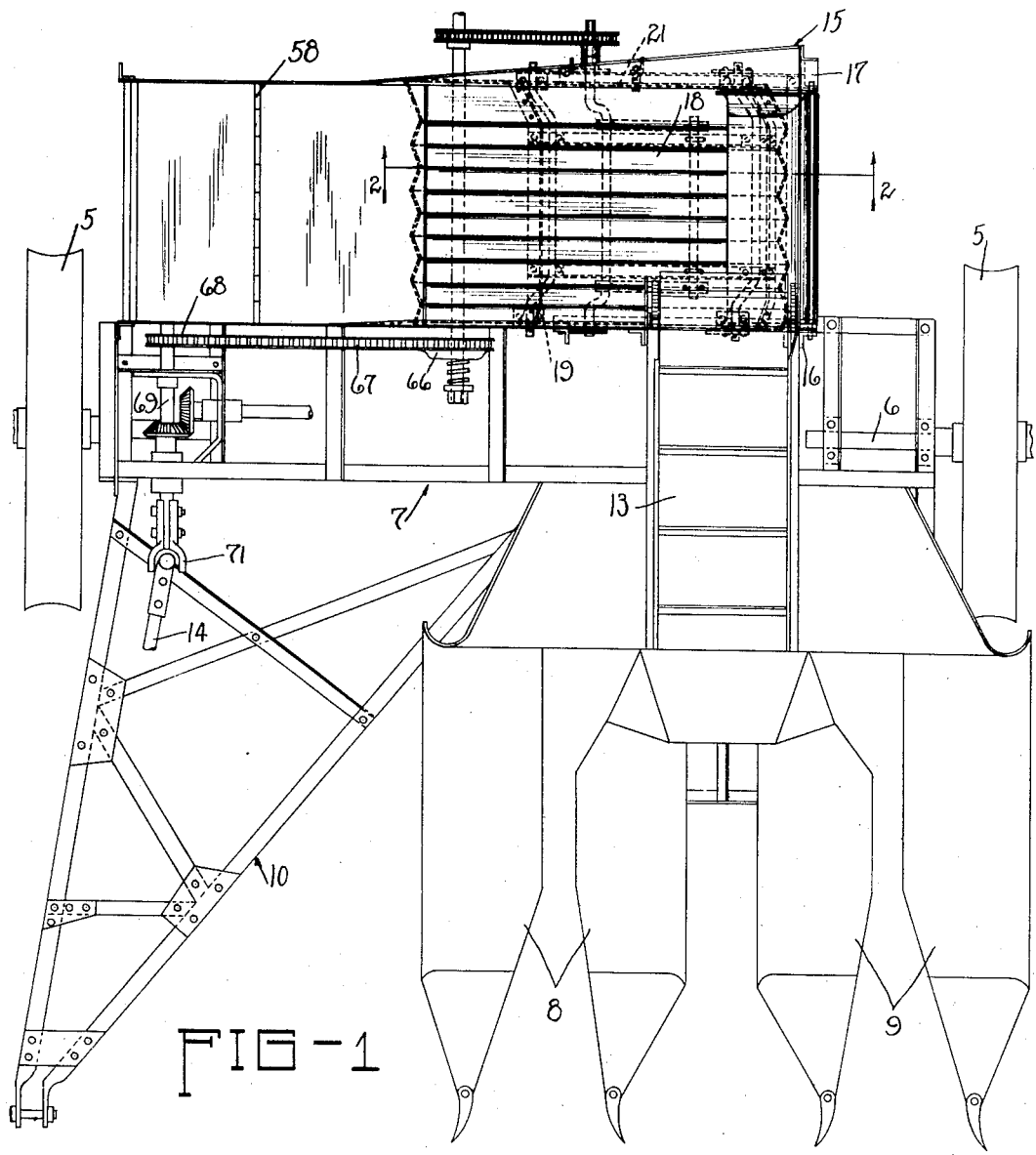
Fig. 1 is a plan view of a two-row corn harvester provided with a shaker hopper bottom, end shield and operating means in accordance with my invention.
Figure 4:
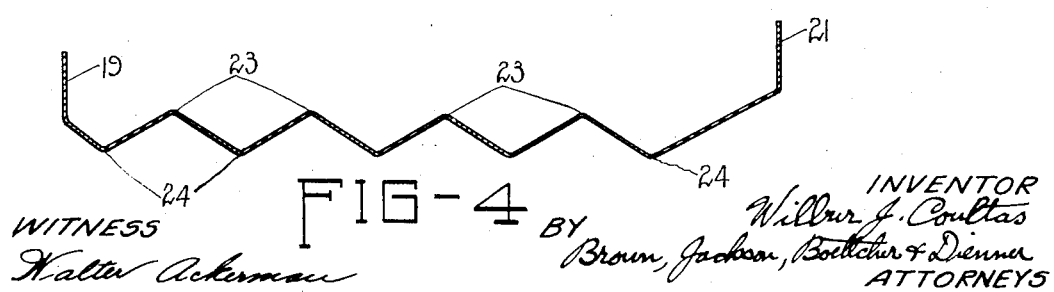
Fig. 4 is a cross-sectional view of the hopper bottom taken along the line 4—4 of Fig. 2.

The two-row corn harvester shown in the drawing, particular reference being had to Fig. 1, comprises main side wheels 5 mounted on axles 6 which in turn support a frame 7. Secured to and rigidly supported by the front frame member of the frame 7 at one end thereof are two sets of snapping mechanisms 8 and 9 with the appropriate shields and chutes suitably connected at the upper end of the supporting mechanism and the frame 7 for guiding the corn ears to an elevator 13.

Since the snapping mechanisms, chutes, and elevator form no part of the present invention, they are only more or less diagrammatically illustrated. Secured to the other end of the front frame member of the frame 7, is a draft member 10. The harvester mechanism is driven from a power take-off shaft 14. The elevator 13 is adapted to deliver corn ears from the snapping mechanism shields and chutes to a hopper generally indicated at 15, mounted on the rear frame member of the frame 7 and supported at its closed end on frame members 16 and 17 above the frame and in spaced relation thereto.

A hopper bottom member 18 comprising a corrugated plate and having up-turned sides 19 and 21 is mounted for oscillatory motion along the bottom of the hopper 15 with the side portions 19 and 21 extending along the outer surfaces of the respective side portions of the hopper and above the lower edges of the side portions of the hopper so that in the lowermost oscillatory position of the hopper bottom member 18 the side portions thereof will still extend slightly above the lower edges of the side plates of the hopper. The hopper bottom is so mounted as to be at all times positioned at an angular relation to the horizontal, sloping longitudinally from the closed end of the hopper to the open end thereof.

Figure 2:
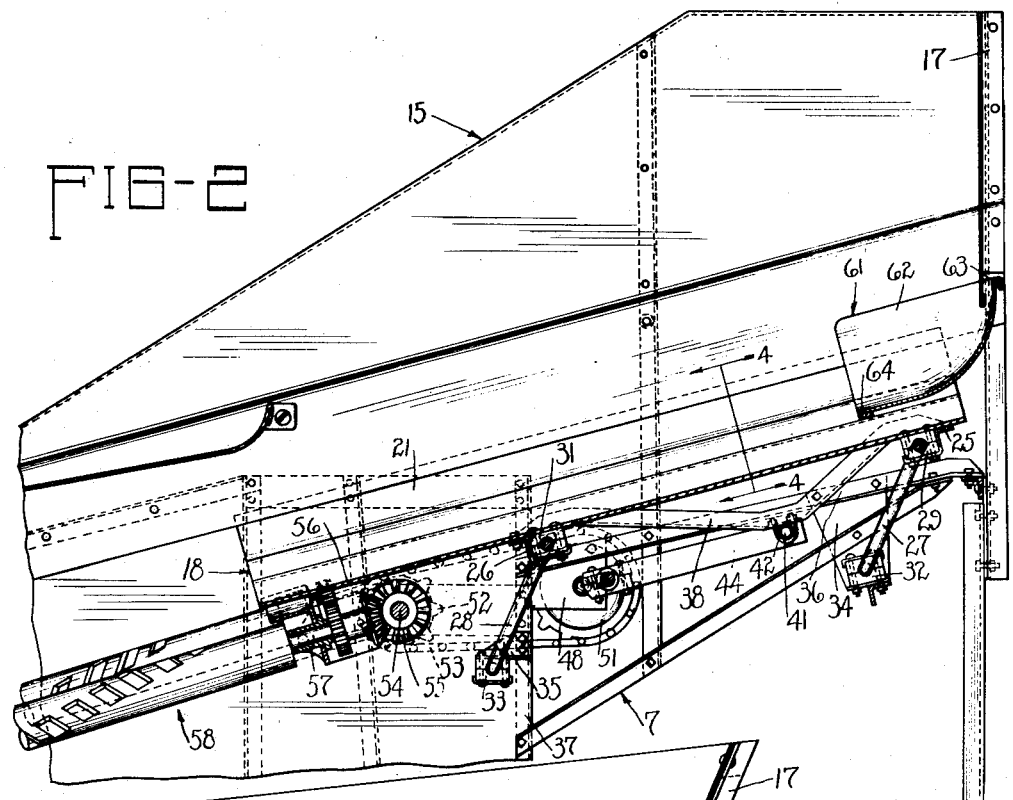
Fig. 2 is a fragmentary vertical cross-sectional view taken along the line 2—2 of Fig. 1.

The corrugations of the hopper bottom member 18 extend longitudinally of the hopper and form crests 23 and troughs 24 therein. Referring specifically to Fig. 2, the hopper bottom member 18 is provided on its under side with two transversely extending angle iron reinforcing members 25 and 26 suitably secured thereto. The hopper bottom is pivotally supported on two bails 27 and 28 of U-shaped formation the intermediate portions of which are journaled in spaced apart bearings, 29 and 31, respectively. The ends of the bail members 27 and 28 are journaled in bearings 32 and 33 respectively suitably secured to and supported by brackets 34 and 35 respectively secured to frame members 36 and 37, respectively. Two spaced apart longitudinally extending members 38 and 39 of U-shaped formation are suitably secured at their ends to brace members 25 and 26, and carried thereon and bridging them on the under side of the members 38 and 39 is a journal member 41 secured to them by U-bolts 42 and 43. Bearings 29 and 31 are secured to members 38 and 39 in abutment with the downwardly disposed flanges of the angle members 25 and 26.

A pair of pitmans 44 and 45 are pivoted one at each end to the journal member 41, the other end of each of the pitmans being pivotally connected to the intermediate portion of a crank shaft 46 journaled at each end in brackets 47 and 48 suitably secured to frame members 36 and 37 at the juncture thereof. One end 49 of the crank shaft 46 extends outwardly beyond the rear of the harvester thru bracket 48 and carries secured thereto a sprocket 51 connected to a sprocket 52 by a chain 53. Sprocket 52 is secured to a shaft 54 extending across the hopper supporting frame and under the hopper bottom 18 and carries thereon a series of spaced apart bevel gears 55 meshing with bevel gears 56 secured to shafts 57 of husking rolls 58 extending longitudinally of the hopper bottom 18, the end of which superposes the ends of the husking rolls 58.

An end pan or shield 61 of arcuate shape and having a curved side 62, is pivotally mounted at the rear or closed end of the hopper 15 on a bolt or journal member 63 passing thru a tubular journal portion provided along the upper edge of the shield 61 and thru recesses in the front and rear vertical frame members 16 and 17.

Figure 3:
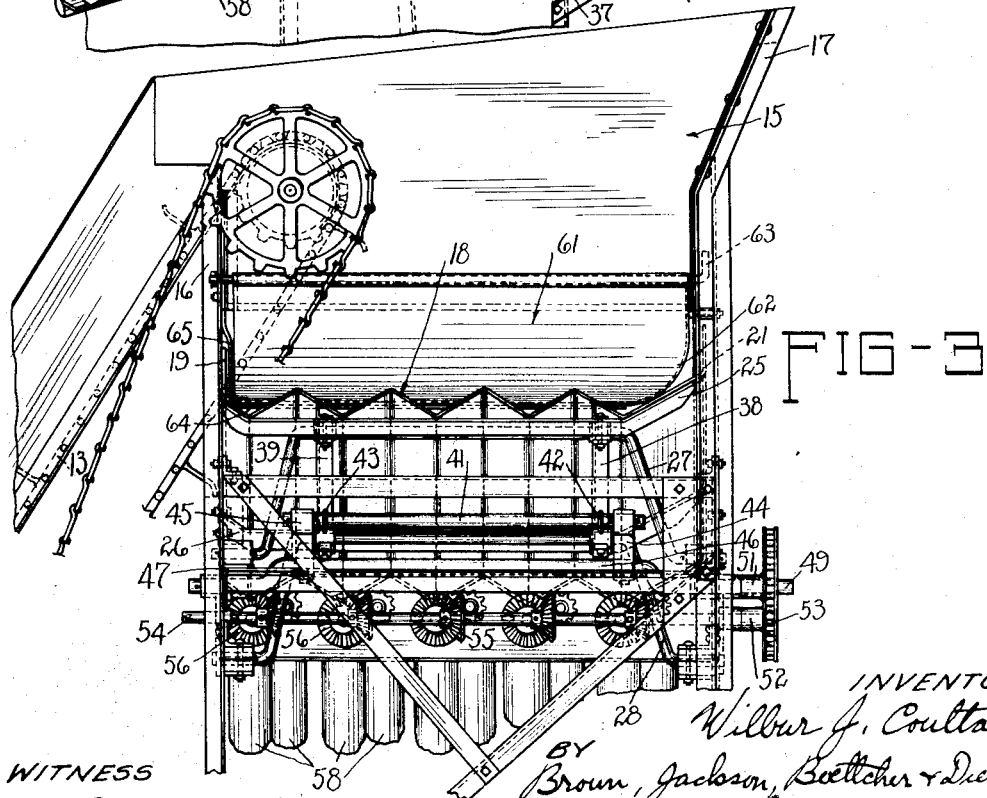
Fig. 3 is a fragmentary end view of the hopper bottom, illustrating its operating means and connections.

The shield is so mounted that the side portion 62 thereof is adjacent to the side of the hopper opposite the discharging end of the elevator or conveyor 13, with the concave face of the shield facing into the hopper. The lower edge of the shield on its under side is provided with a suitable flexible bearing strip 64 such as leather or some similar material which is adapted to rest on the crests 23 of the hopper bottom 18. The strip 64 provides a flexible spacing means and bearing member for the shield 61 relative to the hopper bottom which may be easily and cheaply replaced and prevents damage to either the hopper bottom or the shield incident to the relative sliding movement between these members. The side of the shield adjacent the elevator side of the hopper is open and the hopper side portion is bent inwardly at 65 to overlap the side 19 of the hopper bottom 18 at the same time serving as a fixed shield for the open end of the shield 61 (see Fig. 3).

The husking roll drive shaft 54 extends forwardly of the hopper and husking roll frame beyond the frame and carries thereon at the end a sprocket 66 provided with a slippage clutch driven by a chain connection 67 to a sprocket 68 on a power take-off shaft 69 connected to the power take-off connection 14 by a universal joint 71.

In operation, as rotary motion is transmitted to the husking roll shaft 54 by the power take-off means 14 thru the power take-off shaft 69, sprocket 68, chain 67, and sprocket 66, the crank shaft 46 is rotated thru the chain and sprocket connection 51, 52 and 53. As the crank shaft 46 rotates, it transmits oscillatory motion to the hopper bottom 18 thru the pitmen 44 and 45 connected thereto, the hopper bottom 18 oscillating on the bails 27 and 28. As the hopper bottom 18 oscillates, the end pan or shield 61 in turn oscillates about its journal member 63 due to the frictional contact between the crests 23 of the corrugations in the hopper bottom and the leather strip 64 along the bottom edge of the shield 61. Since the ends of the bails 27 and 28 are journaled in fixed bearings 32 and 33, the oscillatory motion imparted to the hopper bottom 18 simulates a shaking action.

Corn ears received by the snapping mechanisms 8 and 9 as the harvester is drawn along the field, are directed to the conveyor or elevator 13 by the aforesaid side shields and chutes.

The conveyor 13 carries the corn ears to its discharging end whence the ears are deposited on to the hopper bottom 18. Due to the oscillatory motion of the hopper bottom 18 the corn ears are promptly longitudinally aligned in the troughs 24 of the hopper bottom and as the hopper bottom slopes toward the husking rolls 58, a translatory motion is likewise imparted to the corn ears. Such ears as are deposited at the rear end of the hopper upon the end shield 61 are immediately fed to the hopper bottom by the oscillatory motion of the end shield 61 imparted thereto by the contacting engagement of the shield with the crests of the hopper bottom. By reason of the alignment of the corn ears in the troughs of the hopper bottom, the corn ears are delivered to the husking rolls in longitudinal alignment therewith thus insuring that the husking operation will take place immediately upon the depositing of the corn ears on the husking rolls.

It will thus be seen that I have provided a two-row corn harvester with a novel hopper bottom which by its construction and operation and which by its coaction with the end shield assures of prompt and constant feeding of the corn ears to the husking rolls upon delivery of the corn ears to the hopper, and by this action avoiding any congestion and subsequent clogging of the hopper.

By the provision of the above noted element in the hopper, delay incident to congestion of corn ears in corn harvester hoppers is entirely eliminated.

While I have shown a preferred embodiment of my invention, I do not wish to be limited thereto. As will be understood by those skilled in the art, various alterations and modifications may be made in the preferred embodiment without materially departing from the essence of the invention or the spirit and scope of the appended claims.

What I claim, and desire to secure by Letters Patent, is:

1. The combination with a corn harvester having a hopper comprising side walls and an end wall, an elevator for discharging corn ears into said hopper and husking rolls adapted to receive corn ears from said hopper, of an oscillatory hopper bottom comprising a series of longitudinally extending troughs for delivering corn ears received from said elevator to said husking rolls and for aligning said corn ears with said husking rolls, means imparting oscillatory motion to said hopper bottom, a shield in said hopper pivotally mounted on said end wall with its lower edge contacting said hopper bottom and oscillated by movement thereof, and means for preventing wear of said lower edge of the shield and said hopper bottom from contact of one with the other.

2. The combination with a corn harvester having a hopper comprising side walls and an end wall, an elevator for discharging corn ears into said hopper and husking rolls adapted to receive corn ears from said hopper, of an oscillatory hopper bottom comprising a series of longitudinally extending troughs for delivering corn ears received from said elevator to said husking rolls and for aligning said corn ears with said husking rolls, means imparting oscillatory motion to said hopper bottom, a shield in said hopper pivotally mounted on said end wall with its lower edge contacting said hopper bottom and oscillated by movement thereof, and flexible means carried by said shield for preventing wear of said hopper bottom from contact of said bottom with said shield.

3. The combination with a corn harvester having a hopper comprising side walls and an end wall, an elevator for delivering corn ears to said hopper and husking rolls for receiving the corn ears from said hopper, of an oscillatory hopper bottom having corrugations therein in alignment with said husking rolls, said corn ears being adapted to be aligned by reception thereof in the troughs of the corrugations and adapted to be delivered in such alignment to said husking rolls, by the oscillatory motion of said hopper bottom, oscillatory means at the end of the hopper opposite the discharging end thereof for transmitting motion to corn ears received thereon from said elevator to deposit the corn ears on said hopper bottom, said oscillatory means being arcuate shaped adjacent the end wall of said hopper and adjacent the side wall thereof opposite the elevator, and means imparting oscillatory motion to said hopper bottom and said end means.

4. In combination, a corn harvester having a supporting frame, husking rolls journaled in the frame, a longitudinally elongated hopper comprising side walls and an end wall and having a bottom movably mounted with respect to said rolls, a pair of cranks journaled in said frame and pivoted to said hopper bottom, the arms of said cranks being of substantially the same length and extending in parallel relation whereby the hopper bottom may occupy successive parallel positions, means driven from said rolls for swinging said cranks to oscillate the hopper bottom, a shield pivotally connected at its upper end to said end wall and having frictional contact with said movable bottom whereby swinging movement is transmitted to said shield upon movement of said bottom, and means carried by said shield for preventing wear thereof from contact with said hopper bottom.

5. In combination, a corn harvester having a supporting frame, husking rolls journaled in the frame, a hopper having side walls and an end wall, a corrugated bottom in said hopper movably mounted with respect to said rolls and provided with side wall members, a pair of cranks journaled in said frame, transversely extending means secured to the hopper bottom and pivoting the cranks to said bottom, and means for oscillating the bottom, including a power driven shaft, a pitman connected to the shaft, and means connecting the pitman to said transversely extending means, whereby the hopper bottom may be oscillated to direct ears of corn to said husking rolls in longitudinal alignment, the side walls of said hopper bottom telescoping with the side walls of said hopper whereby the sides of said hopper are closed at all times regardless of the position of said bottom upon oscillation thereof.

WILBUR J. COULTAS.